United States Patent [19]

Hilfiker

[11] Patent Number: 4,686,599

[45] Date of Patent: Aug. 11, 1987

[54] MOTOR PROTECTION SWITCH

[75] Inventor: Peter Hilfiker, Buchs, Switzerland

[73] Assignee: Sprecher & Schuh AG, Aarau, Switzerland

[21] Appl. No.: 799,934

[22] Filed: Nov. 20, 1985

[30] Foreign Application Priority Data

Dec. 6, 1984 [CH] Switzerland .......................... 5796/84

[51] Int. Cl.$^4$ .............................................. H02H 5/04

[52] U.S. Cl. ...................................... 361/32; 361/105; 335/17

[58] Field of Search ................. 361/31, 32, 23, 25–27, 361/93, 102, 105, 113, 114; 335/17, 25, 26

[56] References Cited

U.S. PATENT DOCUMENTS

| | | | |
|---|---|---|---|
| 4,081,852 | 3/1978 | Coley et al. | 335/37 X |
| 4,090,158 | 5/1978 | Oeda | 335/17 |
| 4,580,117 | 4/1986 | Hilfiker et al. | 335/17 |

*Primary Examiner*—A. D. Pellinen
*Assistant Examiner*—Derek S. Jennings
*Attorney, Agent, or Firm*—Ladas & Parry

[57] ABSTRACT

The motor protection switch comprises a movable contact piece being manually movable by way of an actuator, which includes actuator buttons. The contact piece can be brought in and out of contact with a resting contact piece. The motor protection switch can also be released by overload current or short circuit current. A retracting or pullback mechanism with two settings settable from outside are provided for the actuator. In the first setting the pullback mechanism will hold the actuator in a trip position between the "on" and the "off" position after overload tripping or short circuit tripping has occurred. In the second setting the pullback mechanism will allow direct movement of the actuator from said "on" position into said "off" position after overload tripping or short circuit tripping has occurred. The simplest embodiment of the pullback mechanism includes a pullback spring acting on a rocking beam mounted between the actuating buttons, the housing side end of which spring is mounted on a slide having two settings. The two settings of the pullback mechanism allow to activate or to deactivate the trip position of the motor protection switch.

7 Claims, 12 Drawing Figures

MOTOR PROTECTION SWITCH

BACKGROUND OF THE INVENTION

1. Field of the Invention

The invention relates to amotor protection switch with a housing and at least one contact piece which is movable relatively to at least one resting contact piece, the movable contact piece being movable against the urge of a spring into an "on" position and back into an "off" position by way of a manually operaed actuating means and through linkage means and wherein said linkage means are locked by a pawl in the "on" position in such a way that the linkage means can be released either by an overload current trigger or by a short circuit trigger and wherein retracting or pullback means are provided for said actuating means.

2. Description of the Prior Art

A motor protection switch of the kind mentioned above is known from EP-A1-0110010. With this kind of motor protection switch the trip position recognizable from the outside will be taken in after every short circuit or overload current tripping. If the trip position of the actuator is taken in without any further indication on the outside, overload current tripping has occurred. If, on the other hand, short circuit triggering gives reason for the trip position, then an additional indicator can be seen from outside. Thus, with this motor protection switch it can be clearly seen from outside whether an overload current tripping or a short circuit tripping has occurred. The reclosing of the switch is effected by first moving the actuator from the trip position to the "off" position, whereupon the switch can be switched on. For certain conditions of operation it would be preferred to cancel the trip position such that after every tripping action the "off" position would be taken in directly. With the mentioned motor protection switch it is not possible to deactivate the trip position.

SUMMARY OF THE INVENTION

The invention aims at providing a motor protection switch which can be manufactured economically and which allows to easily deactivate or activate the trip position.

In order to fulfill these aims the invention proposes a motor protection switch as defined in claim 1. By the first setting of the pullback means the trip position is activated. After every tripping the motor protection switch takes in the trip position. From this position the "off" position has to be taken in by manual actuation before the motor protection switch can be switched on again. In the second setting the motor protection switch switches off without taking in the trip position. From the "off" position the motor protection switch can then be switched on without delay.

In a preferred embodiment a rocking beam is provided functionally connected with the linkage, which beam can be pivoted seesaw-like to the "on" position or the "off" position by the actuation means and which beam is connected to the pullback means. By this embodiment an especially economic and simple solution is given.

The pullback means can comprise of a pullback spring, one end thereof being connected to the rocking beam, the other end thereof being mounted on a mounting point on the housing being movable from the outside from the first to the second setting and vice versa, whereby the resting position of the pullback spring is placed in the first setting in the trip position and in the second setting out of or at the limit of the "on" - "off" area of the rocking beam. Over against the motor protection switch described in EP-A1-0110010 only the mounting attachment of the pullback spring on the housing has to be arranged movably which allows an advantageous economic solution of the problem.

Preferably the pullback means can consist of a leg spring having two elastic legs and of a pin arranged between the legs which engages one of the legs when the actuator is moved, whereby the resting position of the pin between the biased legs can be set from outside to be either in the trip position or on the limit of the "on" - "off" area of the motor protection switch.

The leg spring can be put around the pivot axis of the rocking beam and the pin can be mounted on the beam spaced from the axis, whereby one leg of the leg spring can be pushed away by the pin and other leg engages a stop movable from outside and supported by the housing.

The leg spring can also be arranged at the rocking beam spaced from the pivot axis with essentially radially aligned legs and the pin mounted movably from outside, whereby in the resting position of the pin between the biased legs of the leg pin the two legs engage stops formed on said rocking beam and can be pushed away by the pin.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
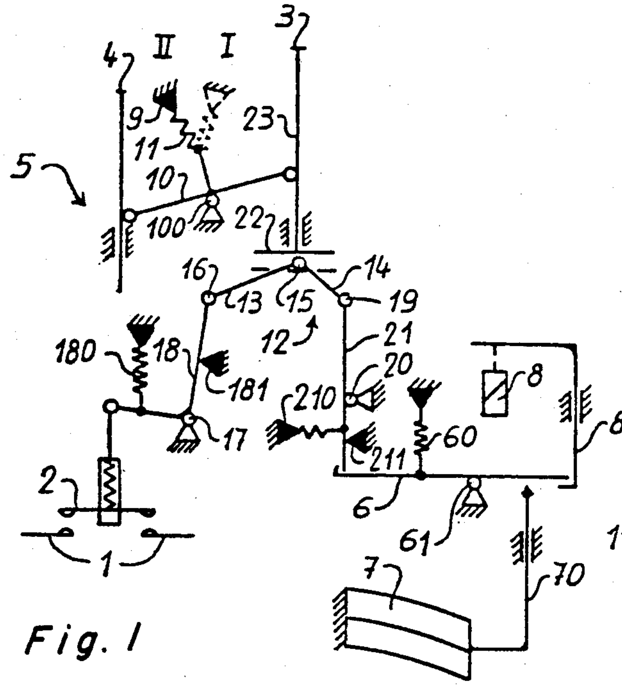
FIG. 1 shows a motor protection switch of the invention in the "off" position with deactivated trip position.

In the drawings the housing of the motor protection switch is hinted at by triangles hatched in one direction, which represent resting points, and by parallel lines which are doubly hatched on the outside and indicate gliding guides or fences fixed to the housing. Joints are indicated by circles.

The motor protection switch which is shown has a pair of resting contacts 1 which are connected to incoming conductors, and a pair of contacts 2 which are movable with respect to the former.

For the purpose of normal switch on and switch off operations, actuating means are provided in the form of a pair of push buttons, with a "switch-on" button 3 and a "switch-out" button 4, which both act on a linkage system 5.

Figure 2:
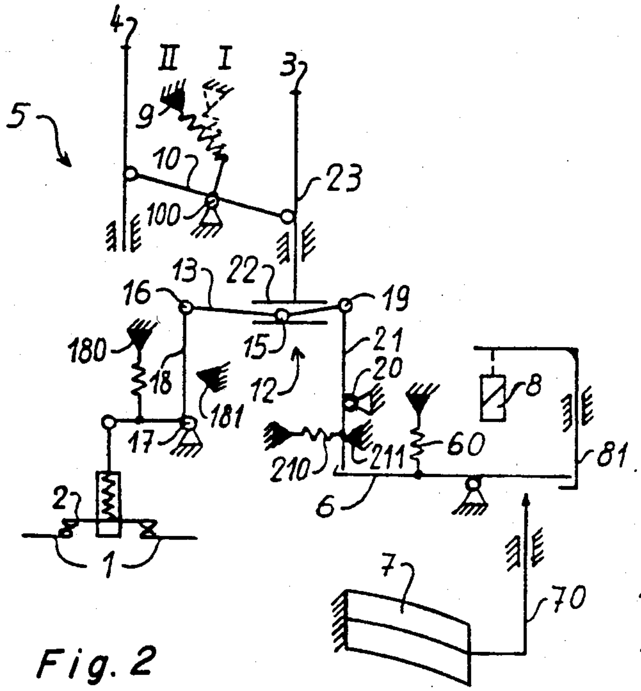
FIG. 2 shows this motor protection switch in the "on" position.

A beam 10 is journalled on the housing at the point 100, and can be actuated by the push buttons 3, 4. A pullback spring 11 urges the beam into its middle position (which corresponds to its trip position in FIGS. 3 and 4). In FIGS. 1 and 2 the trip position is deactivated. The mounting point on the housing has been moved to the left. In these figures the pullback spring 11 in its activated trip position is shown with dashes. The rocking beam 10 is connected with the toggle joint 15 and the toggle levers 12 through the action of a push rod 23 and the sliding guide 22 fixed to said push rod.

Figure 3:
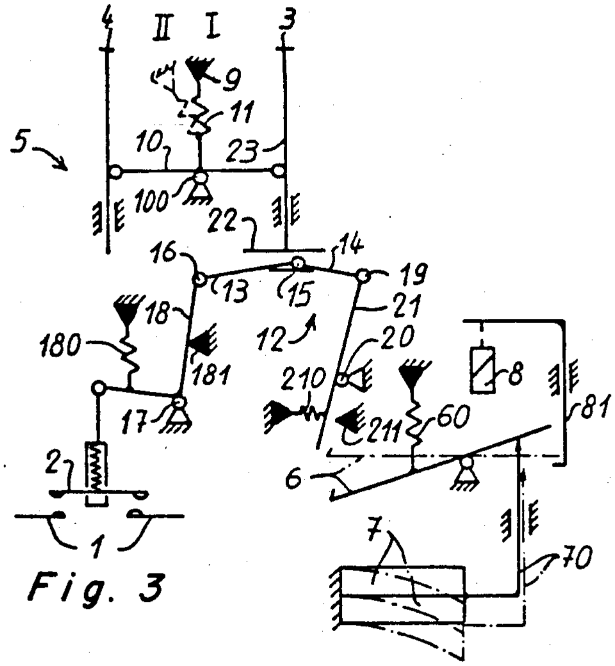
FIG. 3 shows this motor protection switch in the trip position due to an overload current release and with activated trip position.
Figure 7:
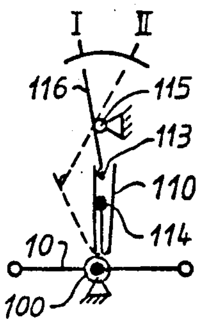
Figure 4:
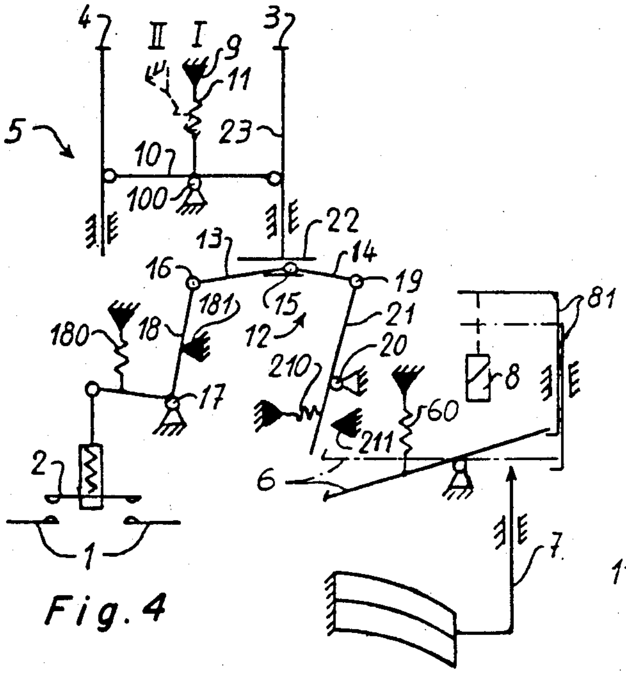
FIG. 4 shows this motor protection switch in the trip position caused by a release due to a short circuit.
Figure 8:
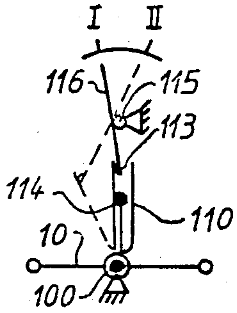

The lever 13 of the toggle assembly 12 is connected by an end joint 16 with the angled contact actuating lever 18. The contact actuating lever 18 is journalled on a rocker bearing 17 and is urged by the spring 180 against the stop 181, in a position in which the contacts 1, 2 are separated (FIGS. 1, 3 and 4).

The arm 14 of the toggle assembly 12 is connected through a joint 19 with the pawl lever 21. This pawl lever 21 is journalled on the housing through the rocker bearing 20 and is maintained in the engaged position (FIGS. 1 and 2) through the pawl 6, against the urge of the spring 210; the pawl lever is thus maintained against or near the stop 211.

The overload current trigger 7 is sketched in the form of a bimetal element which can actuate the pawl 6 through a push rod 70, without thereby moving the releasing linkage 81 of the short circuit triggering device 8.

The short circuit triggering device 8 is represented as an electromagnetic relay, the armature of which actuates the rod 81 when a short circuit current occurs. The actuating rod 81 can thus disengage the pawl 6 without moving the push rod 70 of the overload current triggering device 7.

The motor protection switch can be switched from the "off" position (FIG. 1) into the "on" position (FIG. 2) by pressing the "on" button 3, whereby the linkage system 5 is brought from the "off" position shown in FIG. 1 into the "on" position shown in FIG. 2. Thereby the rocking beam 10 is tilted clockwise and the toggle assembly 12 is moved from its angled "off" position through the straight position (not shown) into its angled "on" position, in which it remains. Because the toggle assembly 12 is maintained through its toggle joint 15 within the sliding guide 22, and is hinged through the outer joint 19 on the pawl lever 21 which is maintained immobile (between the stop 211 and the pawl 6), only the contact actuating lever 18 moves, together with the contacts 2.

Contrariwise, the switching off is obtained through a pressure on the "off" button 4, whereby the system is moved from the "on" position of FIG. 2 into the "off" position of FIG. 1.

If now the motor protection switch is in the "on" position shown in FIG. 2 then it can be triggered and brought into one of the two trip configurations shown in FIGS. 3 and 4, if the trip position is activated.

Release through overload current (FIG. 3): An overload current heats up the overload triggering device 7, which disengages the pawl 6 against the force of the spring 60 through a push rod 70. After the overload current triggering device 7 has cooled down (its current is interrupted by the release), the pawl 6 is pulled back by the spring 60 into its rest position. The trip position of the push buttons 3, 4 shows that an overload current has occurred. Thus the disengaged pawl lever 21 can be brought back through the spring 210 from the engaged position shown in FIG. 2 into the released position shown in FIG. 3. Thereby the outer joint 19 is displaced towards the right and the pullback spring 11 can pull, through the action of the push rod 23, the rocking beam 10 into the trip position. Indeed, the arms of the toggle assembly 12 are now not maintained by the outer joint 19 anymore. The spring 180 can thus pull the contac actuating lever 18 together with the contacts 2 into the "off" position, as the contact actuating lever 18 now is not supported at the outer joint 16.

Resetting into the ready position: The out position of the whole linkage system can be reset by actuating the "out" button, whereby the pawl lever 21 is again pulled by the toggle assembly 12 and through the outer joint 19 into the engaged position. The contact actuating lever 18 rests against the stop 181, so that the outer joint 16 cannot be pulled to the right. The lift of the toggle joint 15 through the sliding guide 22 exerts a pull onto the arm 14, which transmits this pull through the outer joint 19 onto the pawl lever 21. The motor protection switch is ready for switch-on.

Triggering through a short circuit (FIG. 4): When a short circuit occurs, this activates the short circuit triggering device 8 and results in a movement of the pawl actuating linkage 81 and the disengagement of the pawl 6. Thereupon follows the operation which has been already described. The ready position corresponds to the "off" position of FIG. 1.

The pullback means shown schematically in FIGS. 1 to 4 consists of a pullback spring 11, one end thereof is fixed on the rocking beam 10. The other end of the spring is fixed on the housing on a slide 9 movable from the first setting I to the second setting II. In the first setting I (FIGS. 3, 4), the trip position is activated and in the second setting II (FIGS. 1, 2) it is deactivated. When the trip position is deactivated, the resting position of the pullback spring is outside or at the limit of the "on-off" area of the beam.

FIGS. 5, 6, 7 and 8 show another embodiment of the pullback means. In these figures only the rocking beam 10 together with the pullback means are depicted and shown adjacent to the corresponding general view of the motor protection switch according to FIGS. 1, 2, 3 and 4. These pullback means comprise of a leg spring 110 having two elastic legs and of a pin 114 arranged between the legs. The leg spring 110 is placed around the pivot axis 100 of the rocking beam 10. The pin 114 is mounted on the beam 10 on a branch thereof and spaced from the pivot axis. A stop 113 is mounted on a lever 116 which is supported on the housing by the pivot support 115. In the setting I shown in FIGS. 7 and 8 the stop 113 is placed between the unbiased legs of the leg spring 110 with the pin 114 in trip position. The pin 114 and thus the rocking beam 10 are yieldingly held in the trip position. In order to take in the ready position, the motor protection switch needs to be brought in the "off" position by pushing the "out" button 4 and pivoting the rocking beam 10 counterclockwise. This can be effected in that the pin 114 mounted on the beam 10 pushes the left leg of the leg spring 110 in FIGS. 7 and 8 away from the stop and to the left. The further operating sequence of the motor protection switch has already been described above.

Figure 5:
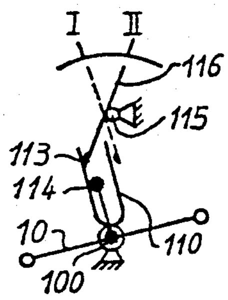
FIGS. 5, 6, 7, 8 show pullback means with a leg pin arranged around the pivot axis of the rocking beam.
Figure 6:
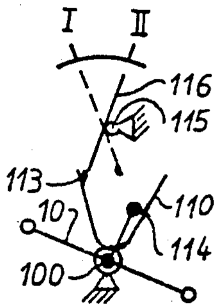

If the stop 113 is brought in the second setting II, shown in FIGS. 5 and 6 with solid lines, by pivoting lever 116, the unbiased legs of the leg spring 110 surround the pin and the stop at the limit of the "on-off"

area of the rocking beam 10. In this second setting II the trip position is deactivated.

Figure 9:
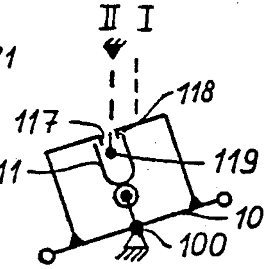
FIGS. 9, 10, 11, 12 show pullback means in different positions with a leg spring mounted on the rocking beam.
Figure 10:
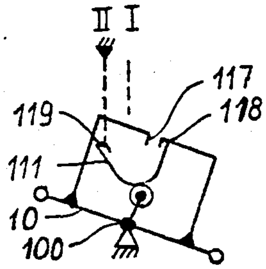

FIGS. 9, 10, 11 and 12 show another embodiment of the pullback means, whereas in these figures as well only the beam 10 and the pullback means are depicted. The other parts of the motor protection switch are identical to the parts shown in FIGS. 1 to 4. In this embodiment a leg spring 111 is mounted on the beam 10 with essentially radially aligned legs and spaced from the pivot axis of the beam 10. The beam 111 can be a spring bent only in U-form or a spiral spring with at least one coil turn at the basis of the U. In their biased position the legs of the spring 111 engage the fixed stops 117, 118 formed on the beam 10. A pin 119 placed between the legs of the leg spring 119 is mounted on the housing movably from a first setting I (FIGS. 11, 12) to a second setting II (FIGS. 9, 10). In the first setting I, shown in FIGS. 11 and 12, the pin 119 is placed between the biased legs of the leg spring, whereby the rocking beam 10 is yieldingly held back in this trip position. In order to take in the ready position, first the "out" button is depressed and the beam 10 is pivoted counterclockwise. With this movement the right leg of the spring 111 disengages the sto 118 and the spring 111 is forced apart. The further operating sequence of the motor protection switch is as has been described above.

Figure 11:
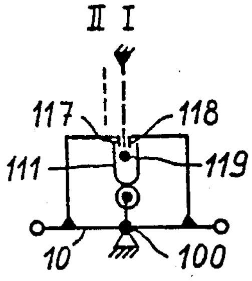
Figure 12:
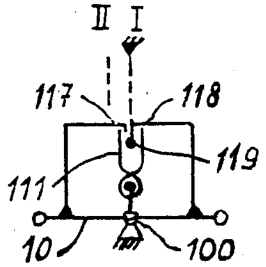

The trip position can be deactivated by this pullback means, too, by moving the pin 119 from the first setting I (FIGS. 11, 12) to the left into the second setting II (FIGS. 9, 10). In FIGS. 11 and 12 this setting II is depicted with dashes. In setting II the pin 119 is placed between the biased legs of the spring 111 at the limit of the "on-off" area of the beam 10. Thus, the trip position is deactivated.

While there are shown and described present preferred embodiments of the invention, it is to be distinctly understood that the invention is not limited thereto, but may be otherwise variously embodied and practiced within the scope of the following claims.

I claim:

1. Motor protection switch with a housing and at least one contact piece which is movable relative to at least one resting contact piece, the movable contact piece being movable against the urge of a spring into an "on" position and back into an "off" position by way of a manually operated actuating means and through linkage means, and wherein said linkage means are locked by a pawl in the "on" position in such a way that the linkage means can be released either by an overload current trigger or by a short circuit trigger, and wherein retracting or pullback means are provided for said actuating means, characterized in that said retracting or pullback means provided for said actuating means comprise two settings being settable from outside, whereby in the first setting said retracting or pullback means are positioned to yieldingly urge said actuating means into a trip position arranged between said "on" position and said "off" position upon overload current tripping or short circuit tripping and whereby the second setting is positioned to induce the direct travel of said actuating means from said "on" position to said "off" position upon current overload tripping or short circuit tripping.

2. Motor protection switch according to claim 1, characterized by a rocking beam operatively connected to said linkage means which is pivotable seesaw-like into said "on" position or into said "off" position, and in that said retracting or pullback means engages said rocking beam.

3. Motor protection switch according to claim 2, characterized in that said retracting or pullback means comprises a pullback spring which is connected with one end thereof to said rocking beam, and which other mounting attachment on the housing is mounted movably from the outside from the first setting to the second setting.

4. Motor circuit switch according to claim 1, characterized in that said retracting or pullback means contains a leg spring having two elastic legs and a pin arranged between said legs which engages one of said legs when said actuating means are actuated, and wherein the resting position of said pin arranged to be set from the outside between said elastic legs is placed either at said trip position or at the limit of the "on-off" area of said motor protection switch.

5. Motor protection switch according to claims 4, characterized in that said leg spring is arranged around the pivot axis of said rocking beam and said pin is mounted on said rocking beam spaced from said pivot axis thereof, whereby one leg of said leg spring can be pushed away by said pin and the other leg engages a stop supported by said housing movable from outside.

6. Motor protection switch according to claims 4, characterized in that said leg spring is arranged at said rocking beam spaced from said pivot axis with essentially radially aligned legs and said pin is mounted movably from outside on said housing, whereby in said resting position of said pin between said elastic legs of said leg spring said two legs engage stops formed on said rocking beam and can be pushed away by said pin.

7. Motor protection switch with a housing and at least one contact piece which is movable relative to at least one resting contact piece, the movable contact piece being movable against the urge of a spring into an "on" position and back into an "off" position by way of a manually operated actuating means and through linkage means, and wherein said linkage means are locked by a pawl in the "on" position in such a way that the linkage means can be released either by overload current trigger or by a short circuit trigger, and wherein retracting or pullback means are provided for said actuating means, characterized in that said retracting or pullback means provided for said acturating means comprise two settings being settable from outside, whereby in the first setting said retracting or pullback means are positioned to yieldingly urge said actuating means into a trip position arranged between said "on" position and said "off" position upon overload current tripping or short circuit tripping and whereby in the second setting is positioned to induce the direct travel of said actuating means from said "on" position to said "off" position upon current overload tripping or short circuit tripping, said retracting or pullback means comprising a pullback spring which is connected with one end thereof said rocking beam, and which other mounting attachment on the housing is mounted movably from the outside from the first setting to the second setting.

* * * * *